United States Patent [19]

Bosne et al.

[11] 4,269,794

[45] May 26, 1981

[54] FIRE CONTROL SYSTEM FOR A GAS AND LIQUID CONTACT APPARATUS

[75] Inventors: Jacques G. P. E. Bosne, Viroflay; Christian A. A. Chofflet, Paris, both of France

[73] Assignee: Hamon Sobelco, Belgium

[21] Appl. No.: 168,686

[22] Filed: Jul. 11, 1980

[30] Foreign Application Priority Data

Sep. 3, 1979 [FR] France .................. 79 21986

[51] Int. Cl.³ .................................... B01F 3/04
[52] U.S. Cl. .................... 261/108; 169/42; 248/550; 261/DIG. 11
[58] Field of Search .......... 261/108, DIG. 11; 169/48, 49, 42, 56–59; 220/88 R; 248/548, 550

[56] References Cited

U.S. PATENT DOCUMENTS

| | | | |
|---|---|---|---|
| 2,718,290 | 9/1955 | Segil | 169/57 X |
| 2,772,742 | 12/1956 | Sprankle | 169/57 |
| 2,800,965 | 7/1957 | Church | 169/57 |
| 3,062,298 | 11/1962 | Nash | 169/57 |
| 3,227,429 | 1/1966 | Renzi | 261/DIG. 11 |
| 3,246,432 | 4/1966 | Young, Jr. | 169/42 X |
| 3,395,515 | 8/1968 | Murray | 261/108 X |
| 3,395,903 | 8/1968 | Norback et al. | 261/DIG. 11 |
| 3,751,017 | 8/1973 | Lemmens | 261/DIG. 11 |
| 3,834,681 | 9/1974 | Fordyce et al. | 261/DIG. 11 |

FOREIGN PATENT DOCUMENTS

| | | | |
|---|---|---|---|
| 2405451 | 5/1979 | France . | |
| 2412047 | 7/1979 | France . | |
| 928602 | 6/1963 | United Kingdom | 261/DIG. 11 |

*Primary Examiner*—Richard L. Chiesa
*Attorney, Agent, or Firm*—Kerkam, Stowell, Kondracki & Clarke

[57] ABSTRACT

An installation for contacting a fluid with a gas is disclosed and comprises an enclosure provided in the lower part of its periphery with at least one gas inlet opening and in its upper part with at least one gas discharge opening. The contact unit is composed of a combustible material, and unit is disposed in the enclosure above the gas inlet opening and is suspended from a framework by hooking means which comprise temperature responsive means adapted to cause release of said hooking means in response to the detection of a predetermined temperature at the most equal to the flame temperature of the contact unit.

9 Claims, 6 Drawing Figures

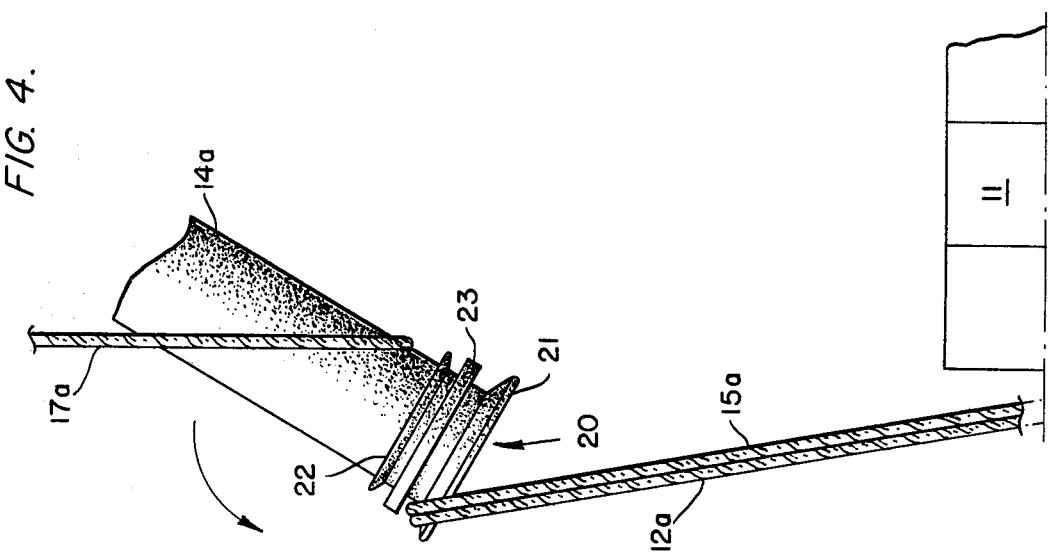
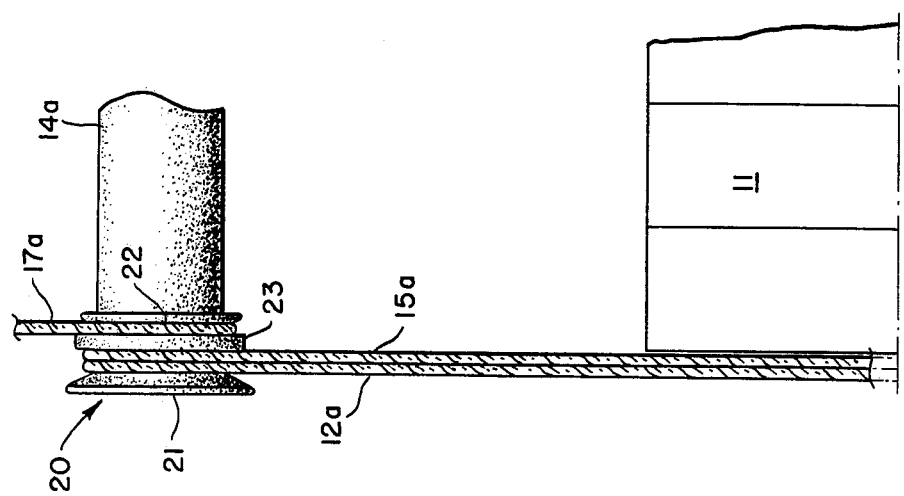
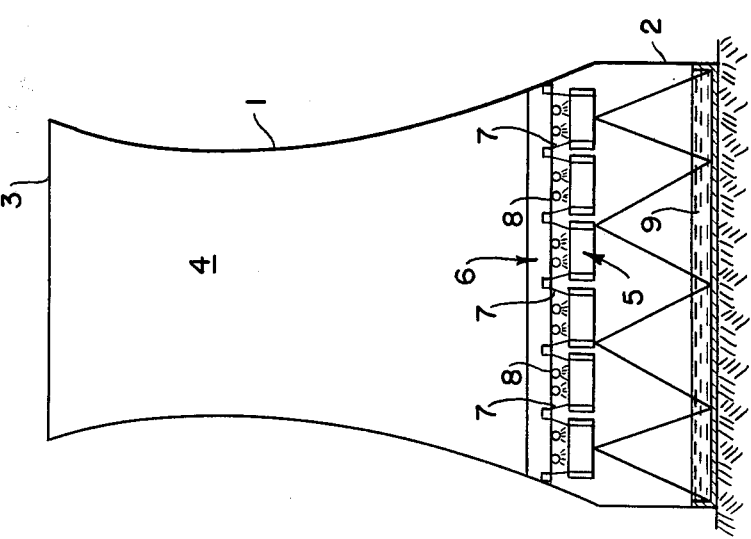

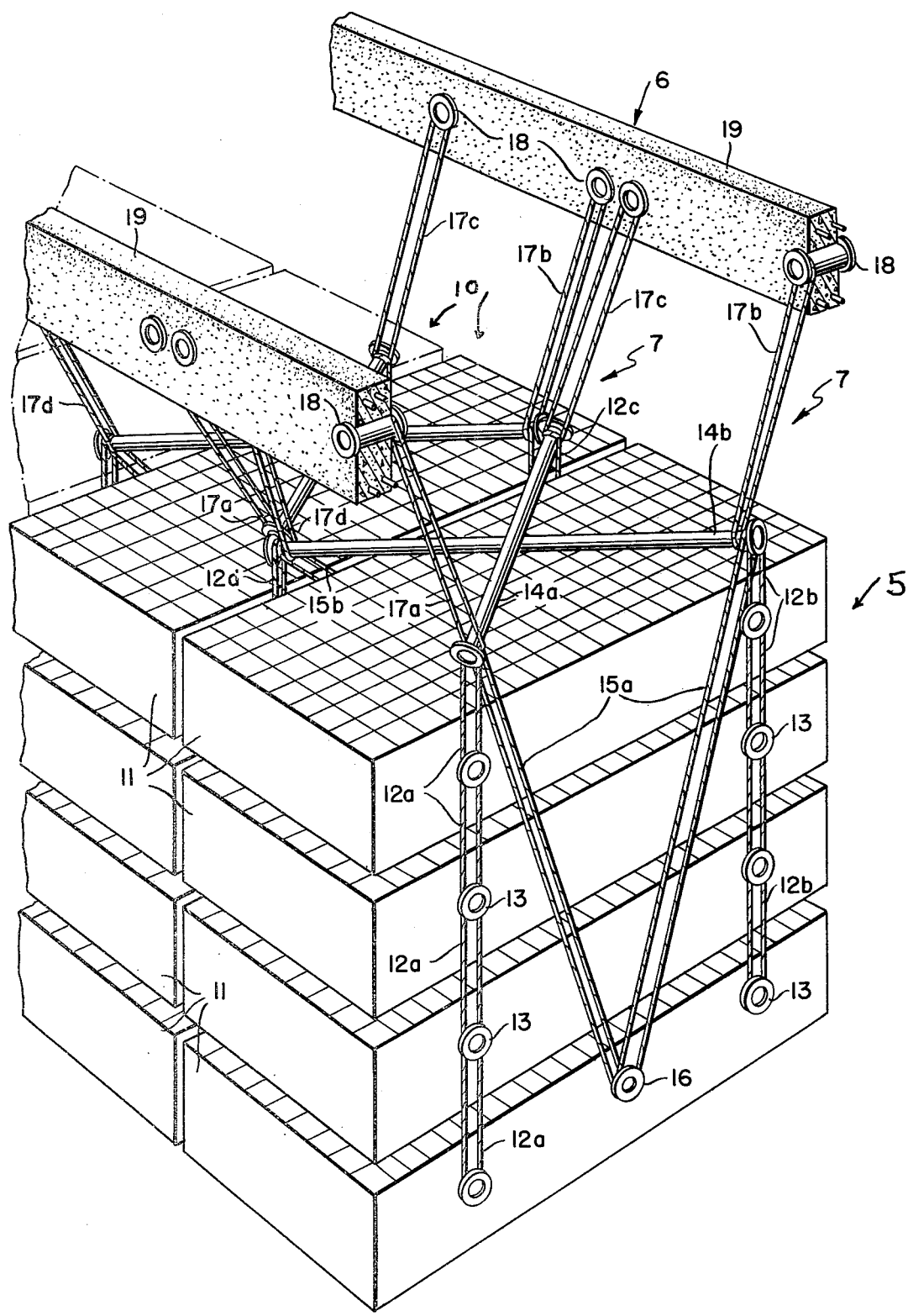

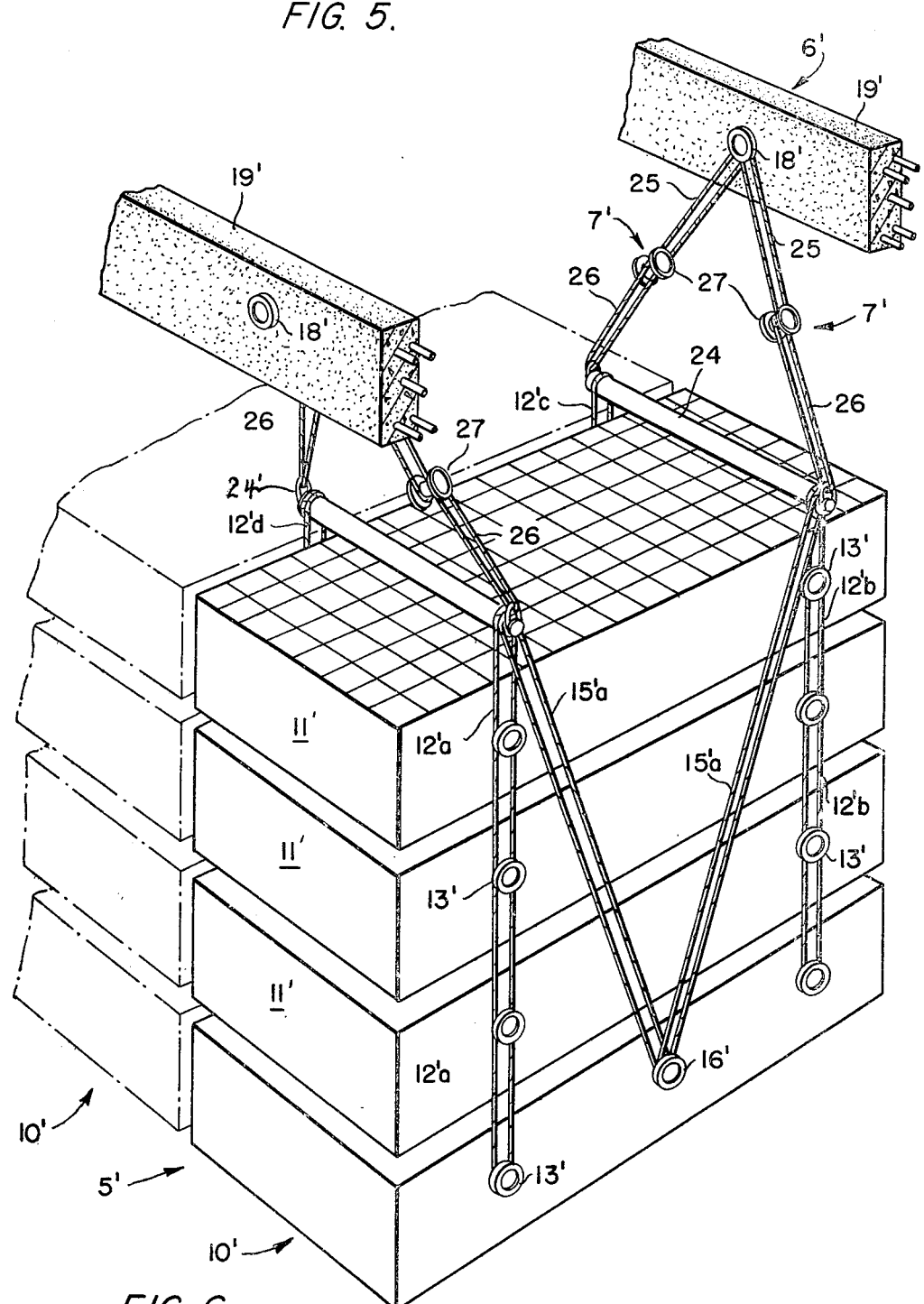
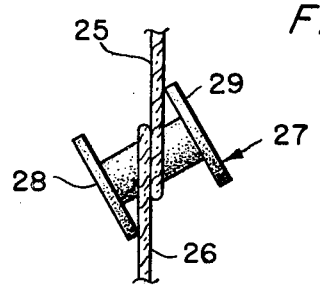

FIRE CONTROL SYSTEM FOR A GAS AND LIQUID CONTACT APPARATUS

DESCRIPTION

1. Technical Field

The present invention relates to gas and liquid contact installations.

2. Background of Prior Art

Gas and liquid contact installations are employed for the cooling of a fluid, for example water, by means of atmospheric air. Generally, such installations comprise a heat exchange unit which is placed in an enclosure provided with an air inlet opening and an air outlet opening, and in which the water to be cooled is placed directly or indirectly in contact with the air between the air inlet and the air outlet from the enclosure. In the case of indirect contact between the liquid and gas, the unit generally comprises batteries of parallel, horizontal or vertical tubes in which the water to be cooled flows, and the air of the atmosphere passes through the tube batteries by way of gaps or spaces between the tubes. In the case of a direct contact heat exchange, the water is brought to the unit by a distribution system and is then sprayed or otherwise distributed on the heat exchange unit about which the air is passed. The latter may be constructed either in the form of an assembly of plates along which the water trickles in the form of thin films, or in the form of an assembly of surfaces which ensure the dispersion of the water in very fine droplets so as to form a mist which passes through the counter-current stream of air.

The heat exchange units are generally constructed from plastic materials, such as polystyrene, ABS, polyethylene, polypropylene or polyvinyl chloride. These plastic materials are based on carbon and hydrogen and burn more or less easily. In the case of atmospheric coolers, fire dangers are insignificant when the cooler is in operation and supplied with water; this is not so when the exchanger is shut down and drained. Further, in the case of atmospheric coolers, or more generally gas and liquid contact installations in which the fluid to be cooled or placed in contact with the gas is not water, possibilities of fire may exist even when the installation is operating. It is consequently essential to provide means to prevent the spread of fire in such heat exchange units, which could result in unrepairable damage to the entire installation, and, also in the case where the exchange unit plates are formed of polyvinyl chloride, the emanation of highly toxic chlorinated compounds result from fires.

BRIEF SUMMARY OF INVENTION

An object of the invention is to provide a gas and liquid contact installation in which the contact unit is suspended from a framework inside the enclosure, as disclosed, for example, in French Pat. Nos. 77 30 221; 77 38 119 and 1 408 931, which ensures that burning of a portion of the contact unit will not propagate to the rest of the installation.

According to the invention, there is provided a gas and liquid contact installation comprising an enclosure provided in the lower part of its periphery with at least one gas inlet opening and in its upper end with at least one gas discharge opening, and a gas and liquid contact unit composed of a combustible material. The contact unit is disposed in the enclosure above the gas inlet opening from a framework by cables or draft members, characterized in that the draft members include temperature responsive means adapted to rupture in response to the detection of a predetermined temperature not greater than the flame temperature of the gas and liquid contact means. By this arrangement, if a fire occurs in the contact unit, the temperature responsive means associated with the draft members causes the unit to drop to the floor of the enclosure. Since the contact units of such installations are usually located at great height above the ground, the flames of the burning unit do not reach other equipment of the installation. Further, in the case where the installation is an atmospheric cooler in which the water to be cooled is in direct contact with the air of the atmosphere, there is provided, in its lower part, a basin for receiving the cooled water so that the water helps to extinguish the fire once a burning unit has dropped into the basin.

According to another feature, in the case where the contact unit is formed by a series of sub-assemblies individually suspended from the framework, each sub-assembly includes the temperature responsive means of the invention. This embodiment enables the sub-assemblies to become individually unhooked when they are enflamed and therefore tends to avoid further spreading of the fire to other contact units.

BRIEF DESCRIPTION OF THE DRAWINGS

Further characteristics and advantages of the invention will be apparent from the ensuing description of different embodiments illustrated by the accompanying drawings wherein:

FIG. 1 is a diagrammatic longitudinal sectional view of an atmospheric cooler of the natural draught type;

FIG. 2 is a perspective view of a heat exchange unit suspended from framework by cables and hooking means according to a preferred embodiment of the invention;

FIG. 3 is a detail view, to an enlarged scale, of a part of the suspension means of FIG. 2 showing its position during the normal operation of the installation;

FIG. 4 is a view similar to FIG. 3, but showing the part upon the unhooking of the exchange unit;

FIG. 5 is a perspective view similar to FIG. 2 of another embodiment of the invention; and FIG. 6 is a view, to an enlarged scale, of a detail of one of the hooking means of FIG. 5.

DETAILED DESCRIPTION OF INVENTION

With reference first to FIG. 1, the illustrated atmospheric cooler comprises a hollow concrete chimney 1 provided at its base with peripheral air inlet openings 2 and in its upper part with an air discharge opening 3. Placed inside the enclosure 4 defined by the concrete walls of the chimney 1 is a heat exchange unit 5 suspended from a framework 6 by draft members and release members generally designated 7. In the illustrated embodiment, the heat exchange unit 5 is of the type in which water is cooled by direct contact with the air of the atmosphere. The water is distributed in the upper part of the unit 5 by a system of tubes 8 having the usual spray heads or the like. The cooled water which falls freely from the lower part of the contact unit 5 is received in a basin 9 which extends across the entire base of the enclosure or chimney 4. Although for reasons of simplicity there has been shown in FIG. 1 an atmospheric cooler which operates by a direct contact of the water with the air of the atmosphere, it is to be understood that the ensuing description is not limited to this type of cooler as the invention is also applicable to coolers in which the fluid to be cooled is in indirect contact with the air of the atmosphere, and to coolers of the "compound" type comprising both indirect contact exchange units and direct contact exchange units, and to coolers of the "hybrid" type which comprise heat exchange units which operate both by direct contact and indirect contact, as described, for example, in U.S. Pat. Application Ser. No. 075,989 filed Sept. 17, 1979, and commonly owned with this application. The invention is also applicable to induced draught coolers employing suction or blower fans.

Referring to FIG. 2 which shows an exchange unit 5 comprising a number of sub-assemblies 10. Each sub-assembly 10 comprises a group of parallel-sided elements 11 which are superimposed and vertically spaced apart from each other. These units 11 are shown diagrammatically and may have any suitable shape whereby it is possible to direct or spray a liquid against their upper ends to place the liquid in direct contact with a gas which enters them by way of their lower ends.

The units 11 are held in suspension by means of suspension members 12a, 12b, 12c, etc. consisting of cables or draft members which pass around the ends of pins 13 fixed horizontally in the elements 11. In the illustrated embodiment, the elements 11 are hooked to each other at four points which are disposed symmetrically on the two opposed longer sides of the elements. The four suspension members 12a, 12b, 12c, and 12d of the upper element are hooked to respective ends of two tubular members 14a and 14b formed of plastic materials. These tubes 14a and 14b extend in a cross configuration above the upper elements 11 and cross each other substantially above the centre of these elements. Two additional suspension members or cables 15a and 15b are provided on each side of the elements 11 and pass about the respective ends of the two tubes 14a and 14b and about an additional pin 16 disposed in the middle of the ends lateral side of each of the lower elements 11. These additional pins 16 prevent bending of the lower elements 11, for example, in the case where the latter would be frozen in cold weather.

Each sub-assembly 10 is suspended from the framework 6 by four suspension cables 17a, 17b, 17c, and 17d which are each respectively hooked to one end of one of the tubes 14a and 14b, and to a pin 18 fixed in the girders 19 of the framework 6.

FIG. 3 shows in more detail the end part 20 of tube 14a to which the suspension cables 12a, 15a, and 17a are hooked. Each end part 20 is reel-shaped and has an outer cheek or flange 21 and an inner cheek or flange 22 of smaller diameter which is adjacent to its tube 14a. Further, an annular flanhge 23 projects from the cylindrical part of the reel between the cheeks or flanges 21 and 22. The lower loop of the suspension cable 17a which supports the end part 20 is entrained about the lower part of the end part 20 between the flange 23 and the cheek or flange 22. The upper loops of the suspension members 12a and 15a encompass the upper part of the end part 20 and are disposed side-by-side between the flange 21 and the flange 23. Each end element 20 of each of the plurality of tubes 14 of the plurality of contact units 11 are similarly engaged by their respective cables 12, 15 and 17, as the case may be.

The operation of the arrangement according to the invention in the case of fire on one or more of the elements 11 of the sub-assembly 10 will now be explained with reference to FIGS. 2 and 4. Since the elements 11 are provided with vertical passages for the water to be cooled and the air of the atmosphere, fire in any one unit would have a tendency to propagate much more rapidly in the vertical direction in the centre of the sub-assembly 10 than in the lateral direction. Consequently, it is the middle part of the tubes 14a, and 14b, where the latter cross each other which is the most rapidly subjected to the high temperature produced by the fire so that these middle parts are first softened or enflamed. As the suspension members 17a, etc., are maintained in position by the flanges 23 of end members 20 which are slightly offset toward the middle of the their respective tubes 14a or 14b relative to the suspension members 12a, 12b, 12c and 12d and 15a and 15b, the weight of the enflamed sub-assemblies 10 exert a torque on the tubes which tends to tilt or bend the heated tubes 14a and 14b. When the middle of the tubes has become sufficiently softened, the tubes 14a and/or 14b break in two in the region of their middle part and simultaneously tilt in the manner shown in FIG. 4. The lower loop of the suspension cables 17a or 17b, etc., then immediately escapes from the reel-shaped parts 20 owing to the fact that the flanges 22 thereof have a small diameter. The four hooking points of the enflamed sub-assembly 10 are then released so that the latter falls vertically to the base of the enclosure 4. It will be noted that, owing to the previously-described arrangement, the four hooking points of the cables to the ends of a pair of tubes 14a and 14b are released simultaneously so that tilting or wedging of the burning sub-assembly is avoided during its fall. If the enflamed sub-assembly falls into the basin 9 filled with water, it is immediately extinguished. On the other hand, if the basin is empty, or if no basin is provided in the case where the heat exchange unit is of the indirect contact type, the enflamed sub-assembly may continue to burn on the ground. However, this would normally be of little or no consequence to the other sub-assemblies or the rest of the installation since the distance between the ground and the lower surface of the heat exchange unit is constructed distinctly greater than the height of the flames from a burning sub-assembly burning on the ground. By way of example, in respect of a heat exchange unit having a height of 2 meters, tests have shown that the height of the flames is of the order of 3 meters. Now in respect of an exchange unit of this height, there is provided between the ground and the lower surface of the exchange unit a height of about 15 meters, so that any risk of propagation of the fire is avoided.

Of course, in order to limit as far as possible the risk of propagation of the fire, it is preferable to construct the tubes 14a and 14b from a material which is capable of yielding at a temperature which is distinctly lower than the flame temperature of the units 11. Thus, if the units 11 are made from polyvinyl chloride, which is the most commonly employed material for this type of equipment, the tubes 14a and 14b may be constructed of polypropylene which has a melting temperature in the neighborhood of 165° C., of high-density polyethylene whose melting temperature is of the order of 130° C., of nylon which has a melting temperature below 250° C., or of any other material which has a melting temperature of the same order of magnitude.

With such materials, the unhooking of the sub-assemblies 10 would therefore occur at a temperature of the order of 250° C. or lower, whereas the ignition temperature of polyvinyl chloride is of the order of 750° C. Consequently, this avoids a generalized burning of the entire exchange unit even if a local fire were lit accidentally or malevolently, since the sub-assembly, or at the most a few sub-assemblies, enflamed by the fire would be unhooked before the neighboring sub-assemblies have time to be engulfed by flames.

FIGS. 5 and 6 show a simplified embodiment of the invention and in this embodiment, the manner of hooking the elements 11' of a sub-assembly 10' to each other is substantially identical to that of FIG. 2. The upper loops of the suspension members or cables 12'a, 12'b, 12'c and 12'd of the upper elements 11' by means of which each sub-assembly 10' is suspended surround the respective ends of two bars 24 which extend transversely, that is to say in a direction parallel to the smaller sides of the elements 11', and between the larger sides thereof. These bars 24 have no particular function to perform in the event of fire and can therefore be made, for example, from metal. The hooking means 7' which connect each end of the bars 24 to the corresponding girders 19' comprise two suspension members 25 and 26 formed as endless cables. The upper loops of the two suspension members 25 associated with the same bar 24 are hooked to a common pin 18' which is disposed vertically above the middle of the considered bar 24. The lower loops of the lower suspension members 26 are hooked to the respective ends of the bars 24 by any suitable means, for example, by rings 24' fixed to the ends of these bars. The lower loop of the suspension member 25 and the upper loop of the suspension member 26 of each of the hooking means 7' are interconnected by a member 27 in the form of a reel shown in more detail in FIG. 6. The reels 27 have an axial dimension which is distinctly larger than the overall axial size of the aforementioned loops on the reel and the diameters of the cheeks or flanges 28 and 29 of the latter are relatively large so that, as shown in FIG. 6, in the suspended position of a sub-assembly 10', the reels 27 assume an oblique position in which the suspension members 25 and 26 have a tendency to escape from the reel but are retained by the flanges 28 and 29 of the latter. The reels 27 are made from one of the aforementioned plastic materials having a relatively low melting temperature so that, in the event of a rise in temperature due to fire, the flanges 28 and 29, subjected to the stress of the suspension members 25 and 26, become deformed and allow the latter to escape from the softened reels 27 so that the considered sub-assembly 10' fails. Although, owing to the lateral position of the reels 27 relative to the sub-assembly 10', this arrangement does not permit the simultaneous release of the four hooking points of a sub-assembly 10' with as much certainty as in the first embodiment, it has the advantage over the latter of requiring only two pins 18' per sub-assembly 10', which simplifies the assembly and reduces the cost of the exchange unit.

Of course, many modifications may be made in the embodiments described hereinbefore without departing from the scope of the invention. Thus, in the embodiment of FIGS. 5 and 6, the bars 24 and the suspension members 26 may be eliminated, the upper suspension members 12'a, 12'b, 12'c and 12'd being then directly entrained about the reels 27. However, the suspension members 12'a, 12'b, 12'c and 12'd would then bear against the upper edge of the upper element 11' and would have a tendency to shear the latter. This drawback could of course be avoided by providing a pin 18' on each girder 19' vertically above the larger sides of the units 11' or by disposing the hooking points of the upper suspension members 12'a, 12'b, 12'c and 12'd on the upper element 11' in the vicinity of the upper edge of the latter. In the embodiment of FIGS. 5 and 6, two pins 18' instead of a single pin could be provided on each girder 19' and the hooking means 7' crossed in such manner that the reels 27 of the hooking means associated with this girder would be in the vicinity of each other. This arrangement would have the advantages of increasing the probability of a simultaneous release of the four hooking points of the sub-assembly 10'. An equivalent effect could be obtained by disposing the tubes 14a and 14b of the embodiment of FIG. 2 not obliquely but transversely, that is to say in the same way as the bars 24. However, this arrangement would be less advantageous than that shown in FIG. 2 since there might be a slight delay between the moments at which the two tubes 14a and 14b might yield.

It will be noted that the scope of the invention is not limited to the use of connecting members between the suspension members which are of a material which yields in the case of fire. The hooking means 7 or 7' could be formed by simple suspension members of heat sensitive material directly hooked to the girders 19 or 19' and to the sub-assembly 10 or 10'. More broadly, any temperature responsive release means adapted to result in the breakage of the hooking means 7 or 7' in response to the detection of an abnormally high temperature may be employed.

We claim:

1. A gas and fluid contact assembly comprising:
   an enclosure;
   a lower peripheral gas inlet for the enclosure and an upper gas outlet from the enclosure;
   a combustible fluid/gas contact unit for the enclosure;
   means for suspending said contact unit in the enclosure above the peripheral gas inlet; and
   said suspending means characterized by including temperature responsive release means to release said contact unit at a predetermined temperature at the most equal to the ignition temperature of the contact unit.

2. A contact assembly as claimed in claim 1, wherein said contact unit is formed by a series of sub-assemblies which are individually suspended from a framework supported in the enclosure, further characterized in that each sub-assembly includes said temperature responsive means.

3. A contact assembly as claimed in claim 2 further including first suspension members hooked to said framework and second suspension members hooked to said contact unit, said second suspension members being hooked to said first suspension members by said temperature responsive means.

4. A contact assembly as claimed in claim 3, characterized in that said temperature responsive means are formed by members which are deformable at said predetermind temperature and shaped to release the second suspension members as a result of their deformation under the effect of said temperature and the weight of said unit.

5. A contact assembly as claimed in claim 4, further characterized in that said members are formed by tubes which extend transversely over said sub-assemblies, at least two tubes being disposed above each sub-assembly, and said first and second suspension members being hooked to the ends of the tubes.

6. A contact assembly as claimed in claim 5, further characterized in that said ends of the tubes each have the shape of a reel provided, having inner and outer flanges and an annular flange located between said inner and outer flanges, the first suspension members being hooked to the reel between the inner flange and the annular flange and the second suspension members being hooked to the reel between the outer flange and the annular flange.

7. A contact assembly as claimed in claim 5 or 6, characterized in that said two tubes are disposed obliquely above each sub-assembly and cross each other substantially vertically above the centre of said sub-assembly.

8. A contact assembly as claimed to claim 4, characterized in that said members are formed by reels, each of which connects a first suspension member to a second suspension member.

9. A contact assembly as claimed in claim 2, wherein said suspending means are formed by suspension members respectively hooked to said contact unit and to said framework and made from a material which is deformable at said predetermined temperature.

* * * * *